US008733371B1

(12) United States Patent
Rassman

(10) Patent No.: US 8,733,371 B1
(45) Date of Patent: May 27, 2014

(54) APPARATUS AND METHOD FOR THE CONTROLLED DELIVERY OF SKIN PRODUCTS AND THERAPEUTIC AGENTS

(76) Inventor: Jan Rassman, Studio City, CA (US)

(*) Notice: Subject to any disclaimer, the term of this patent is extended or adjusted under 35 U.S.C. 154(b) by 0 days.

(21) Appl. No.: 13/447,086

(22) Filed: Apr. 13, 2012

Related U.S. Application Data

(60) Provisional application No. 61/475,627, filed on Apr. 14, 2011.

(51) Int. Cl.
*A45D 24/00* (2006.01)
*A45D 40/26* (2006.01)
*A45D 7/00* (2006.01)
*A01K 13/00* (2006.01)
*A01K 29/00* (2006.01)
*A47K 7/02* (2006.01)
*A47L 1/06* (2006.01)
*A47L 13/10* (2006.01)
*B08B 1/00* (2006.01)
*E04F 21/16* (2006.01)
*E04F 17/08* (2006.01)
*A41D 19/00* (2006.01)
*A41D 19/01* (2006.01)
*B43L 21/00* (2006.01)
*B43L 23/04* (2006.01)

(52) U.S. Cl.
USPC ........... 132/200; 132/162; 132/320; 132/219; 119/601; 119/602; 119/625; 119/651; 119/652; 15/227; 15/104.93; 15/110; 2/158; 2/160

(58) Field of Classification Search
USPC ......... 132/162, 200, 333, 219, 106–114, 116, 132/148, 149, 163, 270, 317, 320, 902, 132/212; 119/600, 601, 602, 603, 605, 611, 119/612, 613, 615, 618, 619, 620, 625, 652, 119/664, 651; 2/16, 20, 21, 158–160, 2/161.1, 161.2, 161.3, 161.7, 161.8, 163, 2/167, 169, 907; 15/21.1, 104.16, 15/104.93, 106, 107, 110, 111, 160, 167.1, 15/227, 209.1, 210.1; 606/9, 908; 401/1, 401/2, 6, 7, 28, 49, 268
See application file for complete search history.

(56) References Cited

U.S. PATENT DOCUMENTS

| | | | | |
|---|---|---|---|---|
| 1,760,928 | A | * | 6/1930 | Whitney ........................ 132/110 |
| 1,795,500 | A | | 3/1931 | Omundson |
| 2,170,550 | A | | 10/1938 | Corel |
| 2,154,822 | A | * | 4/1939 | Quisling ....................... 514/781 |
| 2,376,065 | A | | 6/1943 | Kuszyk |
| 2,577,921 | A | * | 12/1951 | Samel et al. .................. 132/163 |

(Continued)

*Primary Examiner* — Vanitha Elgart
(74) *Attorney, Agent, or Firm* — Lawrence S. Cohen

(57) ABSTRACT

A device for delivering an agent to the skin or the hair or the fur of a recipient. In one form the device has a comb-like extent of tines which are of a carrier material that will melt on contact with skin and thereby deposit an agent that is mixed with the carrier. In other form there is an abrading material in the mixture so as to abrade the skin and thereby allow the agent to be deposited. In the latter case the agent may be an inoculant. The tines may also be placed on a glove so that the agent can be delivered by moving the tines over a selected area to deposit the agent. The device can be in the form of a finger condom having a tine strip. The methods allow delivery of the agent using the various forms of the device and to accomplish various purposes.

22 Claims, 8 Drawing Sheets

(56) References Cited

U.S. PATENT DOCUMENTS

| | | | |
|---|---|---|---|
| 2,785,693 A * | 3/1957 | Bova | 132/163 |
| 3,176,338 A * | 4/1965 | Homburger | 401/7 |
| 3,640,288 A * | 2/1972 | Spanel | 132/212 |
| 3,754,577 A | 8/1973 | Heller | |
| 3,960,154 A * | 6/1976 | Pollard | 132/212 |
| 3,961,635 A | 6/1976 | Miya | |
| 4,057,091 A | 11/1977 | Gardner et al. | |
| 4,107,840 A * | 8/1978 | Kupperman et al. | 30/172 |
| 4,149,551 A * | 4/1979 | Benjamin et al. | 132/200 |
| 4,221,492 A | 9/1980 | Boscardin et al. | |
| 4,308,860 A * | 1/1982 | Sanders et al. | 601/137 |
| 4,317,464 A | 3/1982 | Bailey et al. | |
| 4,766,914 A * | 8/1988 | Briggs | 132/212 |
| 4,834,076 A * | 5/1989 | Millet et al. | 601/154 |
| 4,862,832 A | 9/1989 | Metzner et al. | |
| 5,211,494 A * | 5/1993 | Baijnath | 401/28 |
| 5,325,878 A * | 7/1994 | McKay | 132/116 |
| 5,348,153 A * | 9/1994 | Cole | 206/361 |
| 5,524,575 A * | 6/1996 | Lennon | 119/625 |
| 5,678,273 A | 10/1997 | Porcelli | |
| 5,682,837 A | 11/1997 | Courtney et al. | |
| 5,720,048 A * | 2/1998 | Perez | 2/161.6 |
| 5,800,446 A * | 9/1998 | Banuchi | 606/131 |
| 5,853,012 A * | 12/1998 | Burns et al. | 132/320 |
| 5,975,089 A | 11/1999 | Simon | |
| 6,035,806 A | 3/2000 | Lorenzo | |
| 6,109,214 A * | 8/2000 | Rampersad | 119/600 |
| 6,451,777 B1 * | 9/2002 | Bradbury et al. | 514/169 |
| 6,467,653 B1 | 10/2002 | Hamamoto et al. | |
| 6,647,549 B2 * | 11/2003 | McDevitt et al. | 2/21 |
| 6,748,605 B1 * | 6/2004 | Brinkmann | 2/161.6 |
| 6,834,619 B1 | 12/2004 | Rampersad | |
| 6,968,808 B2 * | 11/2005 | Claire | 119/652 |
| 7,020,898 B1 * | 4/2006 | Pucci et al. | 2/161.6 |
| 7,021,848 B1 * | 4/2006 | Gruenbacher et al. | 401/1 |
| 7,346,955 B2 * | 3/2008 | De Laforcade | 15/227 |
| 7,467,437 B2 * | 12/2008 | Hagleitner et al. | 15/225 |
| 7,694,687 B2 * | 4/2010 | Hurwitz | 132/112 |
| 8,017,162 B2 * | 9/2011 | Shimoda et al. | 424/756 |
| 8,033,287 B2 * | 10/2011 | Cullup | 132/309 |
| 2006/0149297 A1 * | 7/2006 | Sherman et al. | 606/131 |
| 2007/0017538 A1 * | 1/2007 | Hurwitz | 132/110 |
| 2007/0118963 A1 * | 5/2007 | Snyder | 2/158 |
| 2008/0227055 A1 | 9/2008 | Seidman | 433/141 |
| 2008/0313788 A1 * | 12/2008 | Yan | 2/158 |
| 2009/0101163 A1 * | 4/2009 | Brunner | 132/320 |
| 2009/0236359 A1 * | 9/2009 | Linzell | 221/45 |
| 2009/0249573 A1 * | 10/2009 | Ruiz | 15/227 |
| 2009/0299274 A1 * | 12/2009 | Laurent et al. | 604/47 |
| 2010/0163067 A1 * | 7/2010 | Wynne | 132/162 |
| 2011/0030714 A1 * | 2/2011 | Iijima | 132/200 |
| 2011/0067717 A1 * | 3/2011 | McHugh | 132/114 |
| 2011/0257474 A1 * | 10/2011 | Howard | 600/38 |
| 2011/0297180 A1 * | 12/2011 | Sarao | 132/320 |

* cited by examiner

```
┌─────────────────────────────────────────────────┐  40
│       SELECT THE CARRIER MATERIAL, WHICH        │
│         MELTS AT BODY TEMPERATURE               │
└─────────────────────────────────────────────────┘
                         ↓
┌─────────────────────────────────────────────────┐  41
│    EMBED THE DESIRED DELIVERY AGENT IN THE CARRIER │
│                   MATERIAL                      │
└─────────────────────────────────────────────────┘
                         ↓
┌─────────────────────────────────────────────────┐  42
│ FORMING A FLOWABLE MIXTURE OF CARRIER AND EMBEDDED AGENTS │
│                   INTO TINES                    │
└─────────────────────────────────────────────────┘
                         ↓
┌─────────────────────────────────────────────────┐  44
│ FORMING THE FLOWABLE MIX INTO A RIGID HAND HELD CONFIGURATION │
│        WITH THE TINES EXTENDING THERE FROM      │
└─────────────────────────────────────────────────┘
                         ↓
┌─────────────────────────────────────────────────┐  45
│ MOVE THE CARRIER APPARATUS IN ABUTMENT WITH A SKIN SURFACE │
│     FOR A TINE TO MELT THE CARRIER MATERIAL     │
└─────────────────────────────────────────────────┘
```

*FIG. 4*

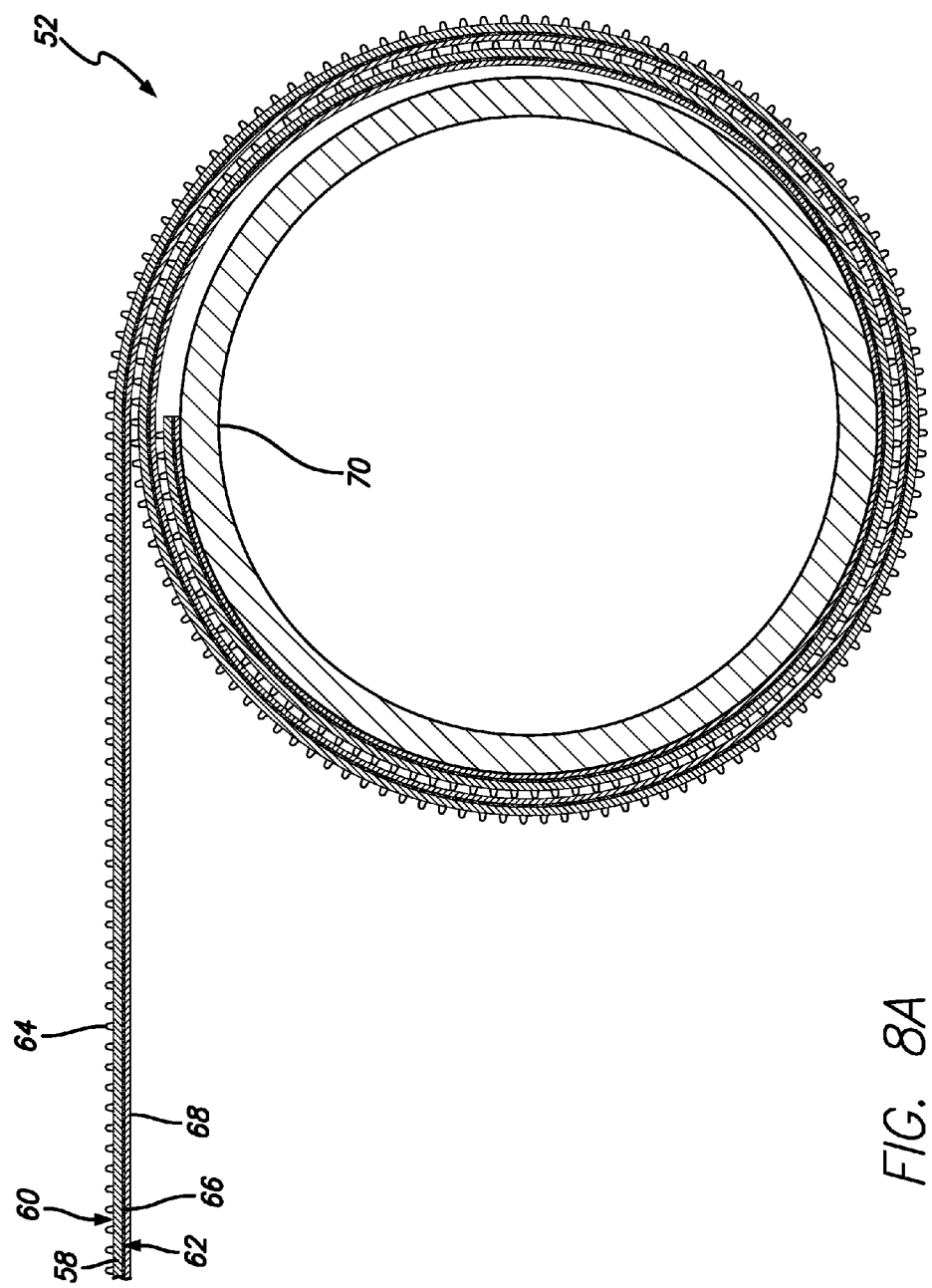

APPARATUS AND METHOD FOR THE CONTROLLED DELIVERY OF SKIN PRODUCTS AND THERAPEUTIC AGENTS

RELATED APPLICATIONS AND PATENTS

This application is related to Provisional Application Ser. No. 61/475,627 filed on Apr. 14, 2011 from which priority is claimed.

FIELD OF THE INVENTION

This invention relates to apparatus and methods for the delivery of beneficial agents onto or into skin tissue.

BACKGROUND

A number of combs and brushes are known to deliver a medication to skin surfaces. They are combs with hollow interior chambers in a backbone that holds a liquid medication and tines that are hollow allowing for the liquid to pass through tines either in a comb or amongst the bristles of a brush. These combs and brushes carry the risk of self contamination due to spillage, contamination of the environment, less control over dosage as it is affected by size of hole and temperature and the majority, if any, are not biodegradable. Prior art devices have been liquid dispensing devices.

Uniform delivery of the medications or concoctions has not been found to be effectively controlled by prior art devices. In some, the liquid merely flows out of openings in a comb at a rate determined by the size of the openings and characteristic, such as viscosity of the liquid, under the influence of gravity. Others utilize pressure at a reservoir where the liquid is applied periodically by a squeeze bulb or continuously from an external source supplying liquid through a tube or hose. Some comb like devices involved complicated valves and other controls which fail and impair the operation of the comb, making them less than satisfactory.

The primary problem with prior known dispensing devices in the form of a comb is that the flow of the liquid through the teeth and onto the scalp, by its nature, depended upon gravitational forces present when the comb (or brush) is used or upon pressure in the reservoir.

Such prior devices do not allow effective application of a liquid or medication to areas of, for example, an animal in which the comb or brush would not be held in an upright position, for example, in grooming the underside of the animal. When the devices were held in an upside-down or sideways position, liquid dispensing would be impacted by gravity and a lack of uniform delivery would be the consequence. Most of the liquid flowed within the chamber to the backbone of the comb so that a non-uniform delivery of liquid with medications (example flea applications) occurs with less than an ideal amount of medication being applied to the animal.

Also a major problem with dispensing devices heretofore known is that the flow of the liquid is generally not uniform onto the receiving surface. In U.S. Pat. No. 4,057,091 for example, a "metered" liquid flow was determined primarily by gravity so that the liquid application is maximized for areas in which the comb teeth are pointed essentially downwardly, but flow is zero in areas in which the comb teeth must be pointed upwardly to reach the application area.

U.S. Pat. No. 2,170,550 shows a comb utilizing absorbent pads in the tips of its teeth which serve to apply the liquid directly to a scalp. Cover air-locks the liquid within the backbone and teeth of the comb to prevent the liquid from pouring out through the teeth tips at an uncontrolled speed by means of capillary action of the pads. However, this device does not obviate the problem of the need for continuance of the flow of the liquid when the device is utilized in a non-upright position. When this device is held in an upside-down or sideways position, the liquid would not reach the absorbent pads in the tips of the teeth in order for the liquid to be dispensed.

Often it is desired to apply liquid to the length of hairs as well as to the scalp. Devices heretofore known have not been entirely successful in accomplishing this result. Previous attempts to produce a comb which would perform regardless of orientation are described in U.S. Pat. No. 2,376,065 where a bulb in the handle is required and U.S. Pat. No. 3,754,577 where the liquid is supplied from an extended hose. The attempts to apply medication grooming aids or cleansing agents have been the subject of many patents all of which have been unsatisfactory in one respect or another.

SUMMARY

In accordance with the principles of this invention, apparatus is provided which has agents embedded within the material of the dispenser and which delivers those agents to or into a skin surface at a rate controlled by the rate at which the material of the apparatus (dispenser) melts or is worn down. In one embodiment, the agents are embedded uniformly in the tines of a comb structure; the tines are made of a material such as candelia (candelilla) or paraffin mixed with wax ester which has a melting point of about 98.6 Fahrenheit such that the tips of the tines melt when moved in abutment against a skin surface. As the tine distal end melts, the embedded agents are released. The agents are delivered to the skin surface as would be the case with minoxidil. In other applications, the tines contain an abrading material which will wear away as it is used.

DEFINITIONS

TINE: Any rigid or semi-rigid extension such as at least a portion of the teeth of a comb or bristle of a brush which maintains its structural integrity until elevated above its melting or solid point by temperature increase from contact with or by friction or both due to movement in abutment against a skin surface. As such tines may have an active portion that comprises a carrier material and an agent or abrading material or both intermixed with the carrier material.

AGENT: Any therapeutic, topological, inoculants or internalizable material releasable from a melted or softened tine and which may also include an abrading material.

CARRIER: Any material that gives a supporting form to the tines or portion thereof that functions for transfer to the skin or fur or hair as the case may be, including material that will melt or soften when raised in temperature so as to be deposited on skin when the tine is drawn along the skin.

DEVICE: A structure of the apparatus of the invention or such as is used in the method of the invention to allow tines to be arranged for use in delivering one or more agents that mixed with the carrier BODY TEMPERATURE: Normally 98.6 degrees Fahrenheit for humans, however an ill person could have a temperature up to about 105 degrees Fahrenheit. Also 95-105 degrees Fahrenheit for mammals and birds, respectively The term refers to the normal body temperature range for which target the tines are selected. The melting (or softening) range to allow transfer to the skin for the tines themselves is set out below.

BRIEF DESCRIPTION OF THE DRAWINGS

FIG. 8A shows a ribbon as in FIG. 7 wound into a roll with release paper adjacent the adhesive on the second face.

DETAILED DESCRIPTION OF THE INVENTION

Embodiments of the invention comprise tines that have a length from an upper end and ending in a distal end. From the distal end toward the upper end a selected length of the tine is configured as a mixture of a carrier material and an agent. The carrier material is selected to melt when it is heated on contact with animal skin, so that it then can transfer the mixture to the skin. The term "melt" is intended to include a degree of softening that will allow transfer to the skin by drawing the tines along the skin, heating the portion in contact to the point that transfer is enabled. In the absence of heating by contact with the skin the carrier material remains in a solid condition that will allow it to be stored and generally handled as long as it is not heated to the melting point. For the purposes described, the melting point should be greater than about 95 degrees Fahrenheit and not more than about 98.6 degrees Fahrenheit which allows for a melting point up to normal body temperature, and of course the melting would be available as temperature gets higher. The range will prevent melting in the ambient environment except in very sever ambient heat, and will allow melting during the application step, that is drawing the tines over human skin, the range including the possibility of an ill person having an elevated temperature. For other mammals, the upper level should be about 95 degrees Fahrenheit, and the lower level should be about 93 degrees Fahrenheit. For birds, the range can either selected lower level and an upper level of about 101 degrees Fahrenheit.

Transfer due the heating step will then deposit both the carrier material and the agent to the skin, wearing away the tines. Details are given below for selected carrier materials and agents for various purposes. In this process the tines will shorten as the transfer occurs.

In an embodiment, an amount of agent can be specified by the length of the tines from the distal end upward that contains the agent.

Figure 1:
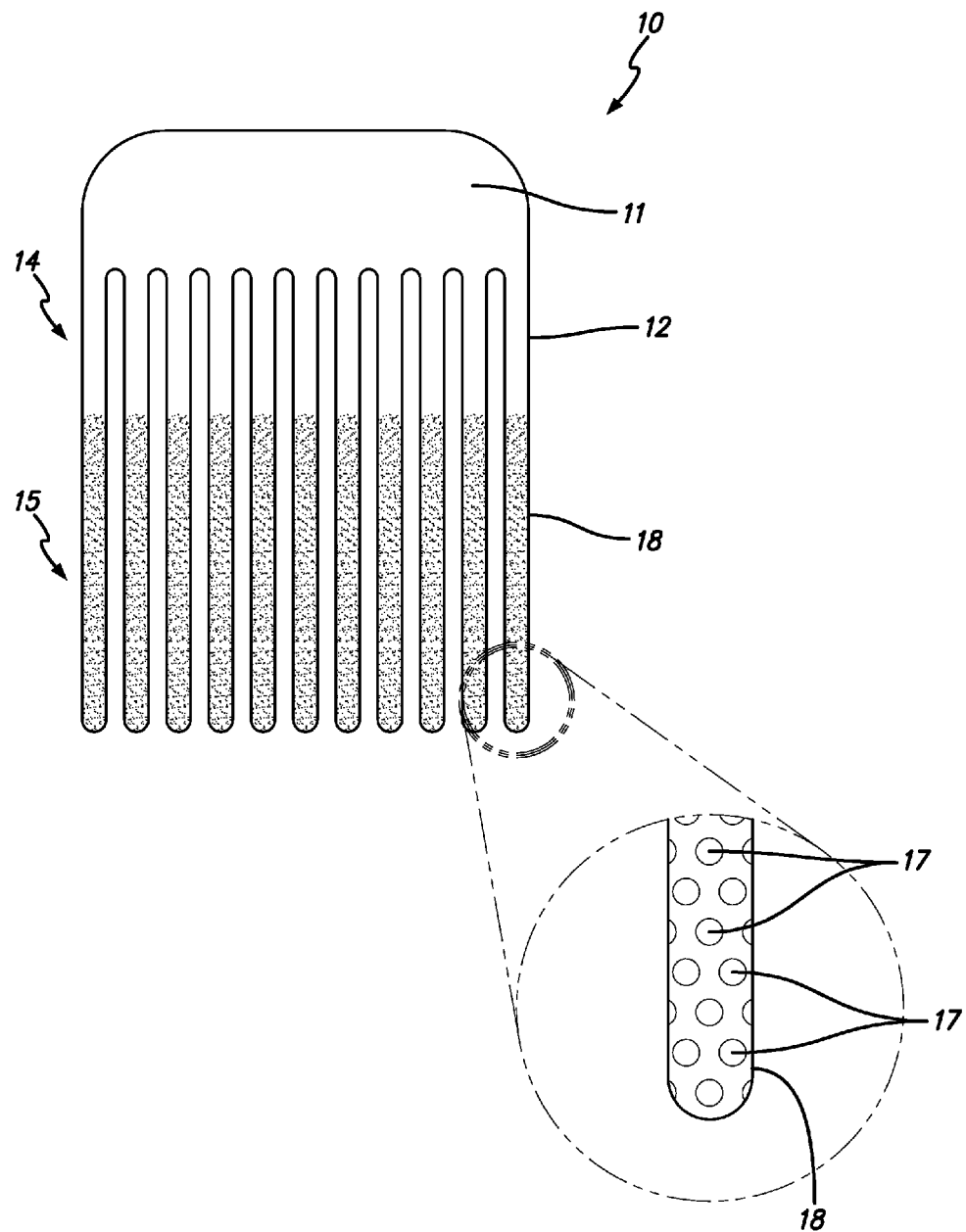
FIGS. 1 and 2 are schematic representations of alternative examples of combs in accordance with the principles of this invention.

In another embodiment, the mixture can contain an abrading material that will abrade the skin. Such embodiments can be made with an inoculant as the agent so that the abrading will allow the inoculation procedure to be effected.

A typical comb shape for of tines can be made as described below. Also, the tines can be configured as part of a glove or mitt. Also, the tines can be made part of a finger condom, such as by a tine strip attached to or otherwise part of the finger condom. Also, a tine strip can be placed on the finger of a glove or mitt.

The particular agent can be from the group used for cosmetic or skin conditioning, from the group for skin therapy purposes and from the group for inoculation purposes.

In use the product should kept in a cool environment such as a refrigerator so as to avoid inadvertent melting if the ambient temperature exceeds the melting point. Some agents will, in any case require refrigeration to preserve their effectiveness.

In a further embodiment, the tines could be coated with a material that has a higher melting point than the carrier and agent materials inside. In such case the coating can be removed at the tip of the tine by friction on the skin or by friction on a rough material. In this embodiment, the coating could have a melting point well above any anticipated ambient temperature. A coating can have a thickness of from 100 nanometers or above. Exemplary coating materials are fatty acids, waxes, shellac, plastics and plant fibers. In the use of a coating for protecting the interior of the tines, the mixture inside could have a lower melting point since it is protected by the coating.

FIG. 1 shows a comb 10 in accordance with the principles of this invention. The comb comprises a spine or base member area 11 configured to be hand held. The spine is structurally rigid and has a plurality of tines 12 extending therefrom. Each tine illustratively is divided into two areas 14 and 15 as shown. Areas 14 are conveniently made of the same material as the spine. Area 15, on the other hand, is made of the same material but also includes embedded agent material in accordance with the principles of this invention. The embedded material 17 is illustrated, in the enlarged view, for an illustrative tine 18.

In the embodiment of FIG. 2, a comb 20 is shown with a spine, or base member, 21 with a plurality of rows or tines 23, the tines are shown with two distinct areas 24 and 25, closed to and spaced apart from the backbone, respectively. The tine segments in the area 25 contain the deliverable agent and may contain a color different from that of area 24 to provide an indication that a new comb is required. The embodiment of FIG. 1 is particularly useful for single use applications such as delivering monoxidil to the scalp and may be made quite inexpensively and disposable. The embodiments of the type shown in FIG. 2 may have multiple rows of tines.

FIG. 3 shows a third embodiment 30 of the invention. Specifically, FIG. 3 shows a glove (or mitt) 31 having a palm area 32. In accordance with the principles of this invention, the palm area includes a pattern of tines constituting, in aggregate, a roughened area 33 illustrated in the magnified image 35 as tines 36.

In the embodiment of FIG. 3, the mitt or glove, of course, is not structurally rigid as is the case in embodiments of the type shown in FIG. 1. Moreover, the tines in embodiments of the type shown in FIG. 3 are considerably shorter than those shown in FIG. 1. But in both types of embodiments, the deliverable agent materials are embedded in the tines and the tines are structured to melt when moved in abutment with a surface in order to release the embedded agents.

In each instance, the concentration and distribution of embedded agents in the tines as well as the rate at which the tines melt or soften or are worn down determines the amount of embedded agent delivered to or into a surface.

Embodiments of a type shown in FIGS. 1, 2 and 3 are usable for applying an agent to a skin surface in a variety of applications. Table 1 lists the type of carrier (comb and/or mitt), the embedded agent and applications for a number of such applications. In one specific example, the carrier (comb) comprises a spine or base member of candelia with tine portions of a mixture of candelia, beeswax and Jojoba with a melting point of 98.6 degrees Fahrenheit. The tines, illustratively, have a uniform distribution of minoxidil therein. The minoxidil conveniently is mixed into the tine material and the comb material is molded into the configuration shown in FIG. 1. The minoxidil is delivered to a human scalp in a controlled manner merely by moving the comb against the scalp and is useful for treating hair loss. The comb in this instance is a single use comb as shown in FIG. 1.

Alternatively, the tine lower portions may comprise sodium hydroxide and fat oil with embedded Deet useful for delivering flea, mosquito or tick repellant and/or insecticides to animals. Particularly for animal applications, the spine or base member may be fastened to a wall in a position for animals to rub against. In such cases, the spine may have a configuration other than a hand held geometry.

Embodiments of the type shown in the Figs. also have a variety of other applications depending on the tine carrier material and embedded agent: Table 1, for example, shows one example with a latex or cotton mitt (or glove) with a palm area of tines comprised of paraffin wax or glycerin with any one of a variety of embedded agents such as Progestin, Estrogen, Testosterone, hormones or artificial hormones such as wild yam extracts, for hormonal therapy, PMS - - - etc. Other possible embedded agents include bacteriocides such as silver nitrate, skin bleaching agents. Also, Zinc or Neem are useful for delivering dermal ointments and compounds, or skin treatment prior to laser exposure, corrosive retardation and plant surface treatment respectively.

Figure 3:
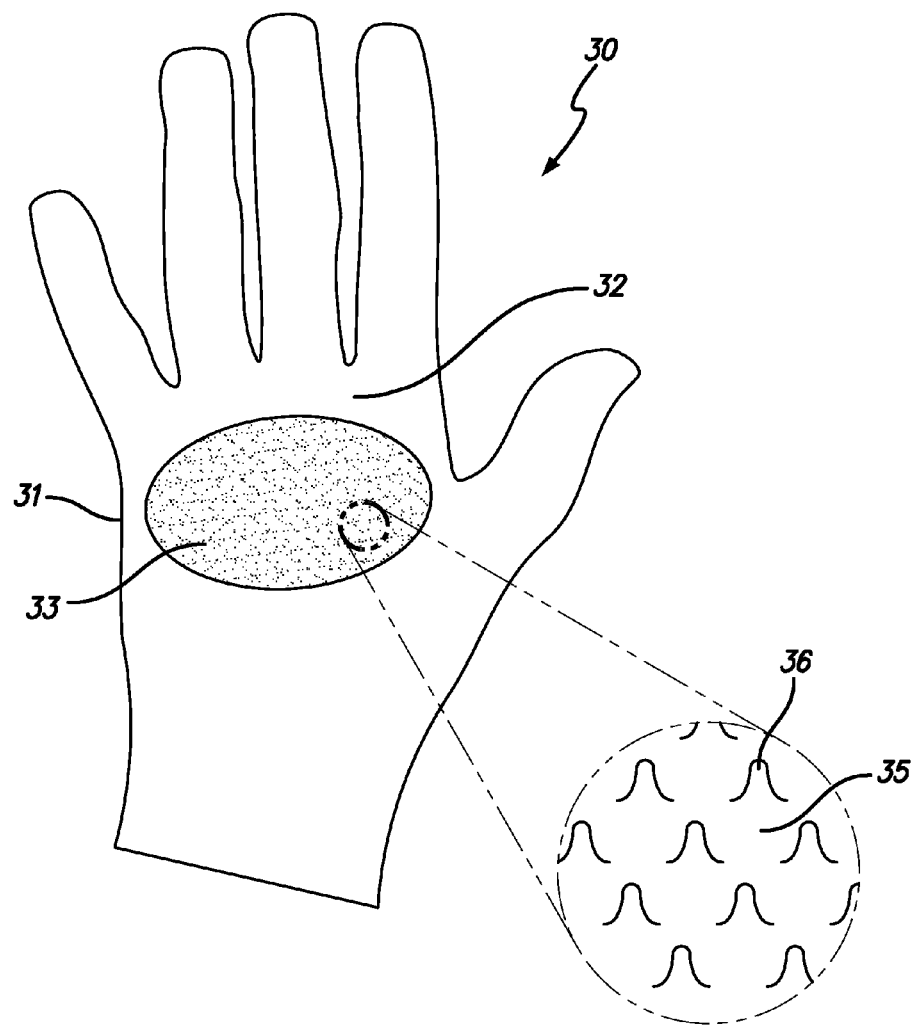
FIG. 3 is a schematic representation of a mitt with a palm surface in accordance with the principles of this invention; and, FIG. 4 is a flow diagram of the method of this invention.

The mitt of the type shown in FIG. 3 is particularly useful to desensitize people against allergic reactions. Desensitization (or immunotherapy) currently occurs in the form of allergy shots to desensitize the body to the allergen. In the case of ragweed pollen, for example, small amounts of the allergen are given in minute doses over a long period of time. The desensitizing process requires a number of physician office visits and waiting there for up to an hour each time to assure that no anaphylactic reaction occurs. Once injected, the allergen cannot be removed and could require hospitalization if such a reaction does occur. The use of a mitt in accordance with the principles of this invention, allows for only a tiny amount of the allergen to be embedded in the tines. When the mitt is rubbed against a body, any allergen remaining on the skin can be rubbed off immediately thereby ridding the patient of the allergen at a much faster rate. The result is that the allergen may be delivered more frequently and at a much more efficacious rate and in a manner (to even include an antidote) which allows any adverse reaction to be well controlled and most likely avoided altogether.

In all instances, in according with the principles of this invention, a tine carrier material is selected which is rigid but which melts or softens at about body temperature as indicated by block 40 in FIG. 4. Then, an agent to be delivered to a skin surface is selected as indicated by block 41 of FIG. 4. A mix is formed with the carrier and embedded material and may include other material, such as softeners, to allow deposit of the tine as it is drawn across the skin. This step is represented by block 42 in FIG. 4. The mix is then formed into self supporting tines extending from a handheld gripping member as indicated in block 44 of FIG. 4. The resulting apparatus is moved in abutment with a skin surface to elevate the carrier material above the melting or softening point of the carrier material to apply the embedded agent to the skin surface. This step is indicated by block 45 in FIG. 4.

Figure 2:
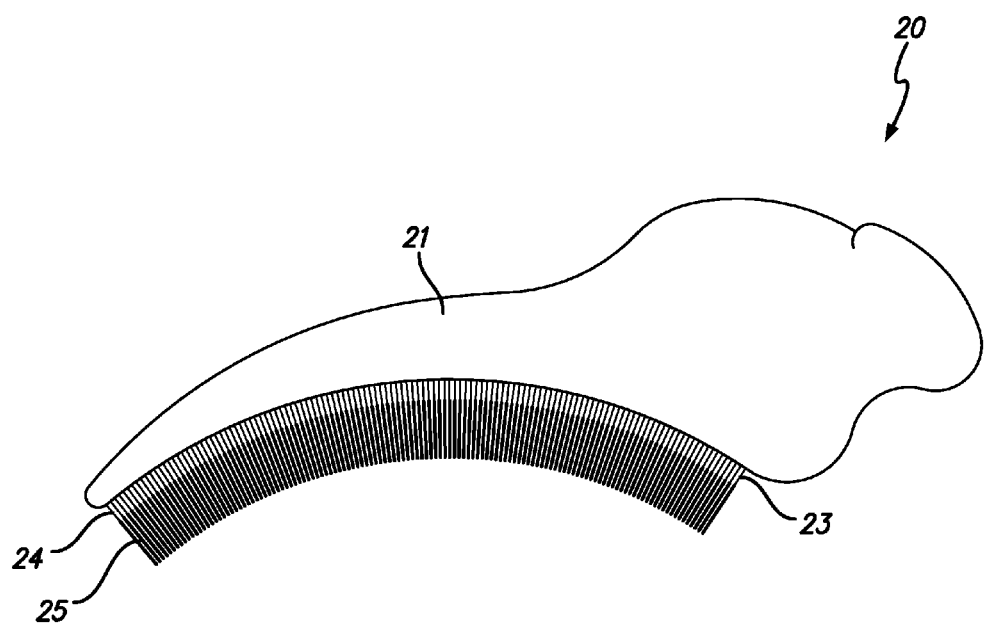

It is to be noted that the "tines" in the application shown in FIGS. 1 and 2 are considerably different from those in FIG. 3. The tines in FIGS. 1 and 2 are relatively elongated where the distal ends of the tines are worn down by elevating the distal end temperature by moving the comb in abutment with a skin surface. The tines in the embodiments of the type shown in FIG. 3 are relatively short and arranged in a brush configuration. In addition, the tine pattern of FIG. 3, conveniently, is molded separately and, for example, heat secured to the palm of a mitt or glove. Further, the tine pattern may be defined on a strip which could come in rolls with an adhesive backing employing a release paper to ease separation of selected strip lengths.

Figure 5:
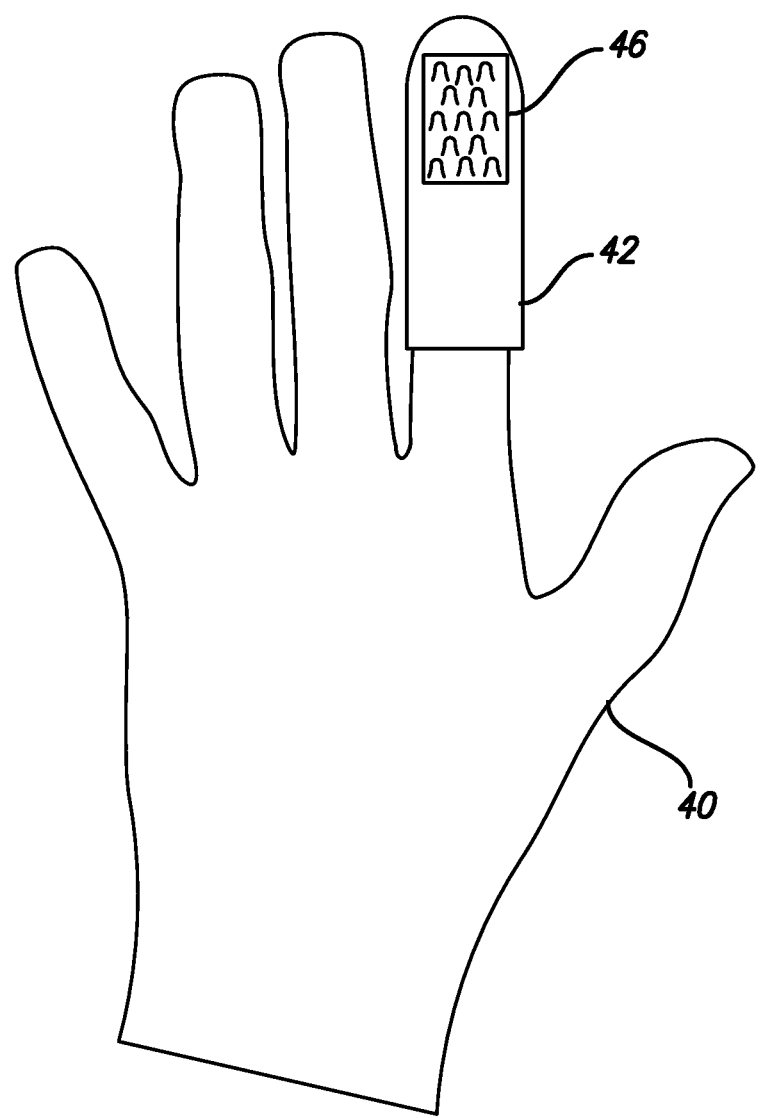
FIG. 5 is a finger condom having a tine strip in which the tines contain an agent which may include an inoculant and an abrading material or it may contain some other agent.
Figure 6:
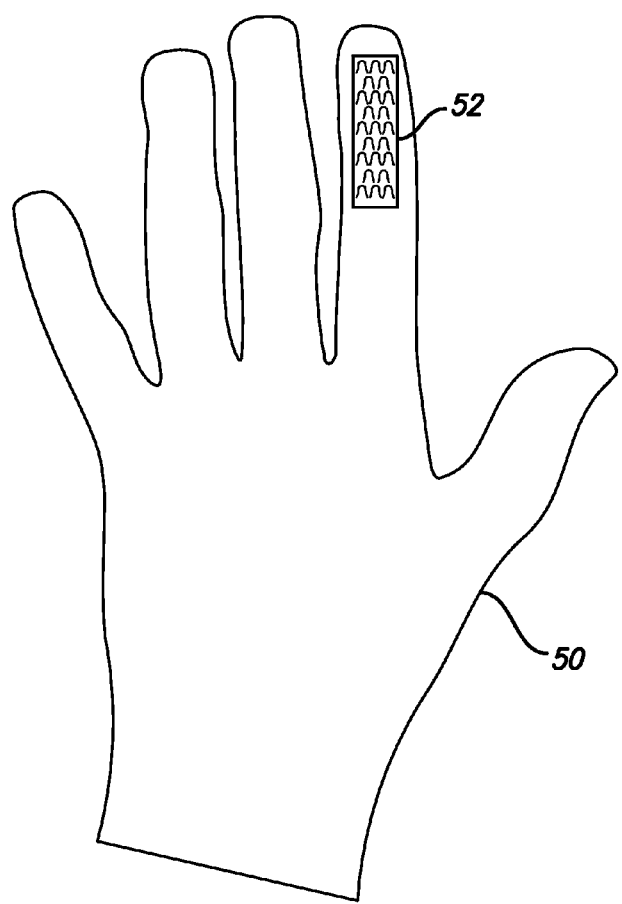
FIG. 6 is a glove having a tine strip on one finger in which the tines contain an agent which may include an inoculant and an abrading material or it may contain some other agent.

A finger condom or glove with a tine strip attached at the distal end of the first digit with tines that have shard particles embedded such as Neem, pumice or silica and include inoculants such as virus particles. Attenuated viruses and allergens can be used to allow for the abrading of buccal and nasal mucosa thereby delivering an immunization or inoculant to a human or animal. A mitt with the tines attached may be used to rub the inside area of the wrist to allow for the delivery of allergens allowing for allergy therapies. The foregoing is illustrated in FIG. 5 which shows a user's hand 40 wearing a finger condom 42 which has a tine strip 46 and in FIG. 6 which shows a glove 50 having a tine strip 52 on the end of a finger.

Figure 7:
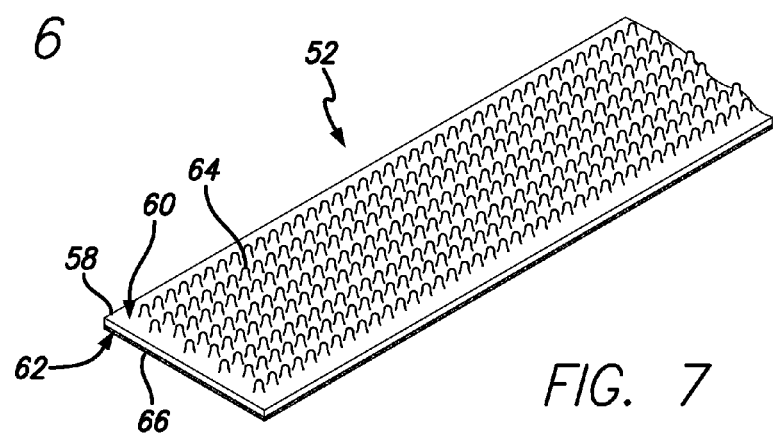
FIG. 7 shows a ribbon of carrier material having tines on a first face and adhesive on a second face.
Figure 8B:
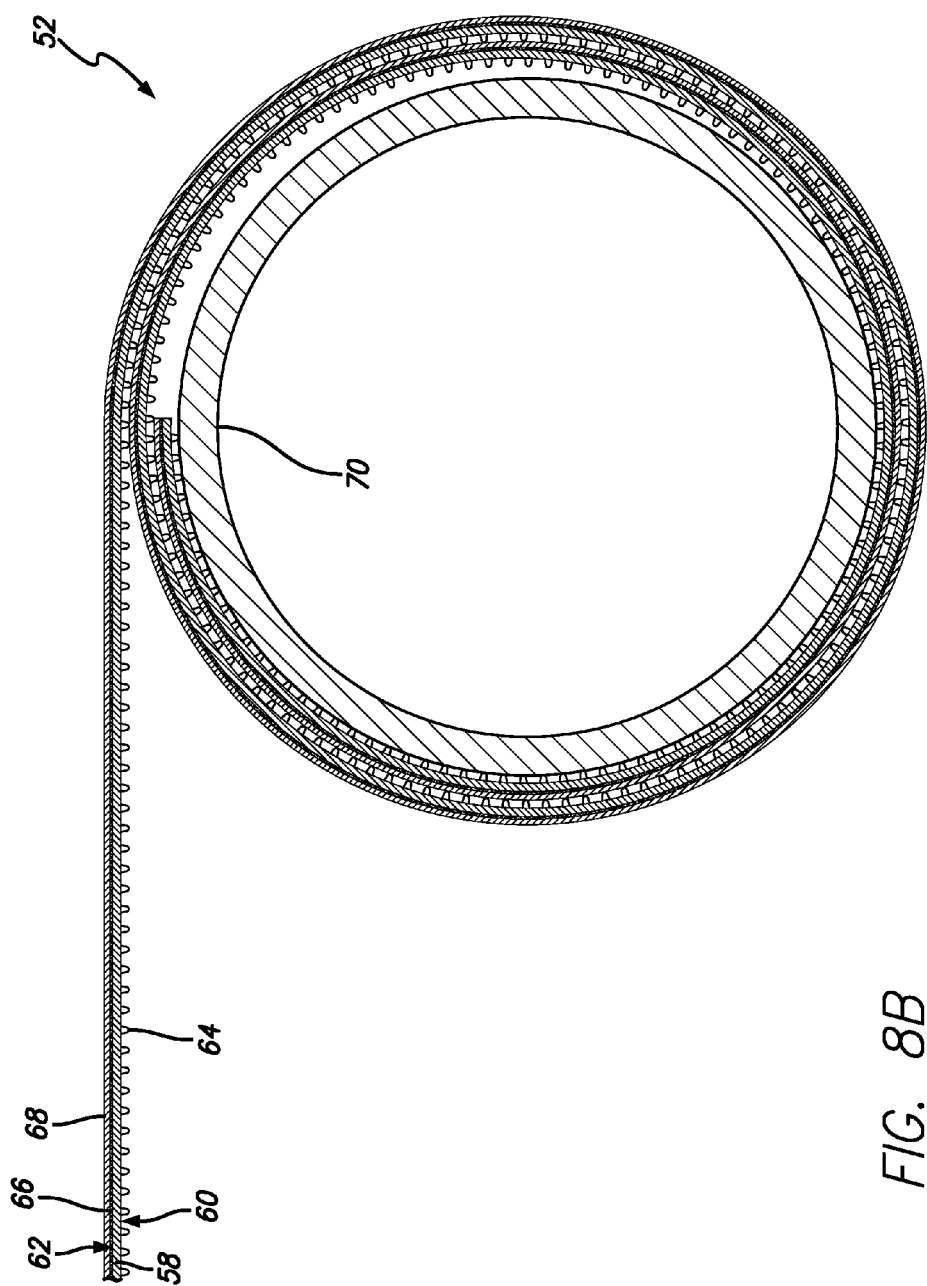
FIG. 8B shows a ribbon as in FIG. 7 wound into a roll but reversed relative to that shown in FIG. 7A.

For the foregoing descriptions as shown in FIG. 7 the tine strip 52 (of FIG. 6) is from a ribbon of carrier material 58 having a first face 60 and a second face 62 with the tines 64 on the first face 60 and having an adhesive 66 on the second face 62 for attachment to a palm surface or onto a glove. Also, in roll forms as shown FIGS. 8A and 8B a release paper 68 can be placed adjacent the adhesive 66 on second face 62 for allowing the ribbon 58 to be wound into a roll which can be done optionally with a roll base 70.

This apparatus allows for the user to self-inoculate. This method could be packaged in a lightweight manner and include instructions for use in the language of choice which then can be air dropped into remote inaccessible areas that possess no roads or air landing strip. It eliminates the risk to humans who otherwise need to have physical access to those who need inoculating and can be used in areas that have been devastated by natural disasters.

As will be apparent from the foregoing, the tines are constructed of a "carrier" material that provides the structural integrity of the tines and mixed into the tines, an "active" material such as an agent or inoculant. As described the carrier material will melt or soften in those applications where the melting or softening is called for such as when deposition on the skin surface of the active ingredient is called for. In other applications, there will be an abrading material such as shard particles in the mix with the carrier. In such cases, the application may not call for melting because the abrading effect will suffice, and in some cases leaving a melted residue may not be desirable. Nevertheless, the use of a melting carrier along with an abrading material is not universally precluded, and may be useful in some cases.

Inoculation can be implemented in the comb form of the invention by implanting in the tines an abrading material such as shard particles that will abrade the skin and allow the inoculant to be deposited on the abraded skin, in the epidermis. In such arrangement, it is not necessary and may not be desirable that the carrier material of the tines be able to melt, since the abrading material will also allow the carrier to be worn away.

Therefore, in general, for surface deposition of the active agent, melting of the carrier is usually acceptable, and for inoculation, the abrading process is used to allow proper deposition of the inoculant into the epidermis.

In use of the comb or mitt form for treating hair or fur, an abrading material in the tines is also useful for enhancing depositing of the active agent on the hair or fur by roughening the fur or hair.

TABLE I

| Carrier material (Comb &/or Mitt) | Embedded Agent | Application |
|---|---|---|
| Parafin or cellulose comb. Sodium Hydroxide and fat/oil in a comb | Minoxidil or Deet | Hair loss prevention. Pesticides. Insect, flea and tick repellants and insecticides. |
| Latex or cotton mitt with palm area of tines comprised of paraffin wax or glycerin or similar compound | Progestin, Estrogen, Testosterone Hormones, artificial Hormone replacements, e.g., Wild Yam extracts Bacteriocides such as silver nitrate. Skin bleaching agents. Zinc Neem | (HRT) Hormonal Therapy e.g. To Treat PMS. Herbal remedies, dermal ointments and compounds. For use prior to Laser treatments. Corrosive retardation. To deposit on plant surfaces (Buds) to kill aphids by dehydration and cellular death. |
| Paraffin Wax and Silica | Attenuated Virus of Similar antigen particles. Pollen, Mumps | To illicit Immune response/therapy for allergies in humans/Inoculation of humans and animals |
| Fabric mitt with paraffin tines in Palm | Alkaline chemicals such as Calcium Thioglycolate and Calcium Hydroxide | To dissolve the protein structure in hair to allow for easy removal as in depilatory cream |
| Sodium Hydroxide and fat in a Comb | Pigmented fibers natural or synthetic | Scalp camouflage for areas where hair is thin |

Although the various features of novelty that characterize the invention have been described in terms of certain preferred embodiments, other embodiments will become apparent to those of ordinary skill in the art, in view of the disclosure herein. Accordingly, the present invention is not limited by the recitation of the preferred embodiments, but is instead intended to be defined solely by reference to the appended claims.

The invention claimed is:

1. Manufacture for the delivery of an agent to an animal skin surface, said manufacture comprising a base member of a geometry to be hand held and having extending from the base member a pattern of tines, said tines extending from an upper end at the base member to a distal end and having at least a selected length from the distal end being made of a carrier material, the carrier material able to maintain its structural integrity until heated to a temperature from being moved in abutment with the animal skin surface, said tines comprising an agent mixed with the carrier material in a manner to be exposed and deposited on the animal skin surface as the tines soften upon being heated by contact when moved in abutment with the animal skin surface.

2. A manufacture as in claim 1 wherein said base member comprises a narrow spine and the tines extend from the spine in a linear arrangement.

3. A manufacture as in claim 1 wherein said base member comprises a mitt having a palm surface, said tines extending from said palm surface in a brush configuration.

4. A manufacture as in claim 1 wherein said tines comprise a mixture of candelia, beeswax and jojoba and have minoxidil embedded therein.

5. A manufacture as in claim 1 wherein said base member and tines are biodegradable.

6. Apparatus for the introduction of an agent to living skin tissue, said agent being embedded in a dimensionally stable base member having tines extending therefrom, said tines having a melting point of not lower than about 95 degrees Fahrenheit and up to about 98.6 degrees Fahrenheit, said agent being of a material and being dispersed in said tines such as to become exposed to be heated by contact with said living skin tissue causing the tines to melt.

7. Apparatus as in claim 6 wherein said base member comprises a rigid spine and said tines are tines of a comb extending from said base member.

8. Apparatus as in claim 6 wherein said base member comprises a mitt with tines attached to the palm or finger surface thereof and said agents are disbursed in said tines.

9. Apparatus as in claim 8 wherein said tines are formed on a first face of a strip having first and second faces, said second face having an adhesive thereon for attachment to said palm or finger surface.

10. Apparatus as in claim 9 comprising a release paper adjacent said second face for allowing said strip to be wound into a roll.

11. A method of delivering an agent to the skin of a human or animal comprising the steps of:
   i. selecting a carrier having a melting point not higher than that of the normal body temperature of a selected human or animal target;
   ii. forming a flowable mix of the carrier with a selected agent;
   iii. forming said flowable mix into tines of a rigid handheld member;
   iv. moving said tines in abutment with a skin surface thereby to cause the carrier material and the agent to be heated by contact with the skin surface so as to melt and be deposited on the skin.

12. A method as in claim 11 including said agent only in the portion of the mix corresponding to the tines.

13. A method as in claim 11 including said agent only in that portion of said mix corresponding to a predefined volume of the distal ends of the tines.

14. The method of applying an agent to a skin surface comprising the steps of: selecting a carrier material which has a melting temperature related to the temperature of skin such that the carrier material will be heated by contact in abutment with the skin surface and will become deposited when moved in abutment with the skin;

embedding a selected agent in said carrier material to comprise a mixture; and moving said mixture in abutment with the skin surface for a time to heat the carrier material to deposit the mixture to the skin surface.

15. The method as in claim 14 wherein the selected agent is ragweed allergen.

16. The method as in claim 14 wherein the selected agent is minoxidil.

17. A method of delivering one or more agents to animal skin comprising:

providing a set of parallel tines held in alignment at an upper end by a holding element said tines from a distal end for a selected distance toward the upper end being made of a mixture of a carrier material and one or more agents and said carrier material having a softening temperature to allow transfer to the skin from heating contact with the skin;

stroking the tines along an area of the animal skin;

transferring the one or more agents along the stroke path from the tines by the softening of the tines due to heat from contact of the skin.

18. The method of claim 17 wherein the softening temperature is in the range from about 95 degrees Fahrenheit to about 98.6 degrees Fahrenheit.

19. The method of claim 17 wherein the carrier material comprises paraffin wax.

20. The method of claim 17 wherein the softening temperature is in the range from about 95 degrees Fahrenheit to about 105 degrees Fahrenheit.

21. The method of claim 17 further wherein the tines have a protective coating and in use the protective coating is first invaded to release the mixture inside.

22. The manufacture as in claim 1 further comprising a protective coating on the tine at least over the carrier material and the agent.

* * * * *